United States Patent
Hendren et al.

(10) Patent No.: US 9,207,484 B2
(45) Date of Patent: Dec. 8, 2015

(54) COMPUTER LED BAR AND THERMAL ARCHITECTURE FEATURES

(71) Applicants: Keith J. Hendren, San Francisco, CA (US); Dinesh C. Mathew, Fremont, CA (US); Nicholas Alan Rundle, San Jose, CA (US); Brett W. Degner, Menlo Park, CA (US)

(72) Inventors: Keith J. Hendren, San Francisco, CA (US); Dinesh C. Mathew, Fremont, CA (US); Nicholas Alan Rundle, San Jose, CA (US); Brett W. Degner, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 13/628,005

(22) Filed: Sep. 26, 2012

(65) Prior Publication Data

US 2014/0085564 A1    Mar. 27, 2014

(51) Int. Cl.
   *G02F 1/1333*    (2006.01)
   *G02F 1/1335*    (2006.01)

(52) U.S. Cl.
   CPC .... *G02F 1/133385* (2013.01); *G02F 1/133308* (2013.01); *G02F 1/133382* (2013.01); *G02F 2001/133628* (2013.01)

(58) Field of Classification Search
   CPC .................... G02F 1/133308; G02F 1/133382; G02F 1/133385
   USPC ........................................ 349/58–60, 72, 161
   See application file for complete search history.

(56) References Cited

U.S. PATENT DOCUMENTS

| | | | |
|---|---|---|---|
| 4,608,622 A | | 8/1986 | Gonser |
| 6,930,737 B2* | | 8/2005 | Weindorf et al. ............... 349/60 |
| 7,903,227 B2 | | 3/2011 | Kang |
| 8,113,706 B2 | | 2/2012 | Lin |
| 8,379,182 B2* | | 2/2013 | Dunn ........................... 349/161 |
| 2006/0002135 A1 | | 1/2006 | Kokeny et al. |
| 2007/0031777 A1 | | 2/2007 | Wang et al. |
| 2008/0025013 A1 | | 1/2008 | Lockamy et al. |
| 2008/0074903 A1* | | 3/2008 | Nam et al. .................... 362/613 |
| 2009/0051293 A1 | | 2/2009 | Houdek et al. |
| 2009/0091913 A1 | | 4/2009 | Li et al. |
| 2010/0165660 A1 | | 7/2010 | Weber et al. |

FOREIGN PATENT DOCUMENTS

JP         4187414 B2     11/2008
WO    WO2011094249 A2      8/2011

OTHER PUBLICATIONS

International Search Report in International Application No. PCT/US2011/022494, Oct. 18, 2011.

* cited by examiner

*Primary Examiner* — Dung Nguyen
(74) *Attorney, Agent, or Firm* — Downey Brand LLP

(57) ABSTRACT

The described embodiments relate generally to liquid crystal displays (LCDs) and more particularly to thermal management of heat produced by an illumination source in an LCD module. High temperatures generated by the illumination source can cause color shifts in the LCD due to changes in any included LEDs and liquid crystals. One solution is to house the LCD module in a metal chassis and thermally couple the LED light bar to the metal chassis. Furthermore, the LCD module can be kept at a uniform temperature by transferring heat from a region near the LED light bar to a relatively cooler region of the LCD module. These approaches can minimize any alterations or shifts in color resulting from heat from the LED light bar.

21 Claims, 10 Drawing Sheets

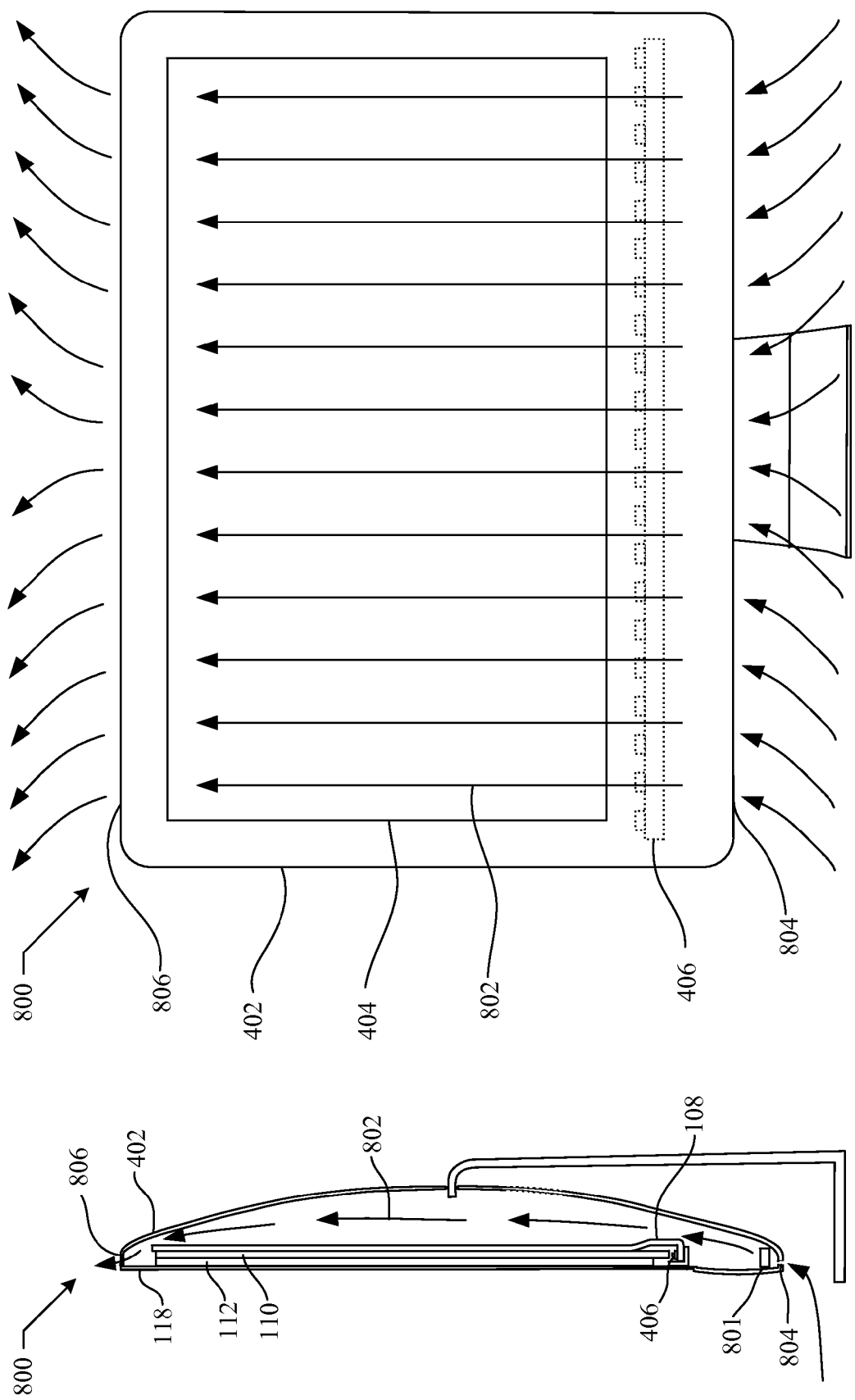

COMPUTER LED BAR AND THERMAL ARCHITECTURE FEATURES

FIELD OF THE DESCRIBED EMBODIMENTS

The described embodiments relate generally to liquid crystal displays (LCDs) and more particularly to thermal management of heat produced by an illumination source in an LCD module.

BACKGROUND

LCDs are commonly used in a variety of consumer electronics devices including televisions, computer monitors, laptop computers and mobile devices. A typical LCD module can include an LCD cell, light guide, illumination source, and electronics. The illumination source can be located along one or more edges of the light guide and LCD cell and can include light emitting diodes (LEDs), fluorescent lamps, incandescent light bulbs, or any other suitable light source. In addition to producing light, the illumination source can generate an amount of waste heat. This waste heat can create several thermal management issues. In particular, there are several ways in which the waste heat produced by the illumination source can affect the color of light emitted from the LCD module.

First, when the illumination source is an LED light bar, an increase in temperature can change the color of light directly emitted from the illumination source. LEDs can be particularly susceptible to heat and an increase in temperature can change the color, or wavelength, of light emitted from the LEDs. This can be particularly important with white light because a human eye can differentiate small color changes in white light. LCDs can produce white light either by using white LEDs or a combination of colored LEDs that combine to produce white light. As the temperature of the LEDs increases, the resulting white light can shift towards the blue side of the spectrum. Thus, if the LED light bar increases in temperature, the color of an image displayed on the LCD cell can shift. Moreover, if one portion of the LED light bar is hotter than another portion, a color shift can be visible when looking from one portion of the LCD cell to another.

Second, liquid crystals within the LCD cell can be affected by waste heat as well. Liquid crystals can control the color of an individual pixel by adjusting the amount of white light that is directed into several color filters. As the temperature of a liquid crystal increases, the amount of white light passed into the color filters can change, altering the color of the pixel. The illumination source can be mounted along one edge of the LCD cell. Therefore, the heat generated by the illumination source can cause a side of the LCD cell near the illumination source to be hotter than a side opposite from the illumination source. This can result in a color shift across the screen that can be visible to a user.

Therefore, what is desired is a way to efficiently remove waste heat from an illumination source while maintaining an approximately uniform temperature across a nearby LCD cell.

SUMMARY OF THE DESCRIBED EMBODIMENTS

The present disclosure relates generally to a waste heat transport system for removing heat from an illumination source included in an LCD module. The LCD module can include an LCD cell, light guide, illumination source, and electronics. The illumination source can generate a significant amount of waste heat during operation of the LCD module. Often, the illumination source can include a row of LEDs mounted on a surface, referred to as an LED light bar. When this is the case, the waste heat can increase the wavelength of light generated by the LEDs, resulting in a color shift. Furthermore, the waste heat generated by the illumination source can affect the operation of liquid crystals included in the LCD cell, resulting in an additional color shift across the length of the LCD cell. By providing a waste heat transport system for removing heat from the illumination source and distributing heat evenly across the LCD cell, both of these effects can be reduced.

Waste heat from the illumination source can be removed by thermally coupling the illumination source to a frame or chassis within a device including the LCD module. When the illumination source is an LED light bar, a row of LEDs can be coupled to a metal core printed circuit board (MCPCB) to conduct heat away from individual LEDs. The MCPCB can then be coupled to a thermally conductive chassis configured to draw heat away from the illumination source. A thermal pad or thermally conductive adhesive can be placed between the MCPCB and metal chassis to increase the thermal conductivity of the connection. In one embodiment, a layer of graphite can be disposed on a surface of the metal chassis to increase thermal conductivity. In another embodiment, cooling fins can be included on the metal chassis near where the metal chassis is thermally coupled to the illumination source. The cooling fins can increase dissipation of waste heat through convection. In yet another embodiment, an MCPCB with sufficient thickness to receive a threaded fastener on the side can be used. By attaching the MCPCB from the side, sufficient space can be made available on the LED light bar to incorporate an increased number of smaller, colored LEDs in place of larger, white LEDs. By using colored LEDs that match a color filter in the LCD cell, the percentage of light passing through the color filters can be increased. This can reduce the amount of light produced by the illumination source, along with the corresponding waste heat.

In addition to removing waste heat from the illumination source, the waste heat transport system can reduce color shifts by maintaining an approximately uniform temperature across the LCD cell. In one embodiment, waste heat can be transported from a relatively hotter region of the LCD cell near the illumination source to a cooler region using one or more heat pipes. In another embodiment, electronics such as LCD display drivers that generate waste heat can be strategically placed near relatively cooler regions of the LCD cell to balance the hotter temperatures near the illumination source. In yet another embodiment, the thermally conductive chassis can include regions with different thicknesses configured to direct waste heat towards cooler regions of the LCD cell. Finally, waste heat can be transferred from the illumination source to relatively cooler regions of the LCD cell by configuring airflow through the device to pass over the illumination source and continue in a direction towards the cooler areas of the LCD cell.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings. These drawings do not limit any changes in form and detail that may be made to the described embodiments. Any such changes do not depart from the spirit and scope of the described embodiments.

FIG. 8A shows a cross sectional view of a computing device in which an included LCD module is kept at a uniform temperature using an airflow from the bottom to the top of the device.

FIG. 8B shows a front view of a computing device in which an included LCD module is kept at a uniform temperature using an airflow from the bottom to the top of the device.

DETAILED DESCRIPTION OF SELECTED EMBODIMENTS

Figure 1A:
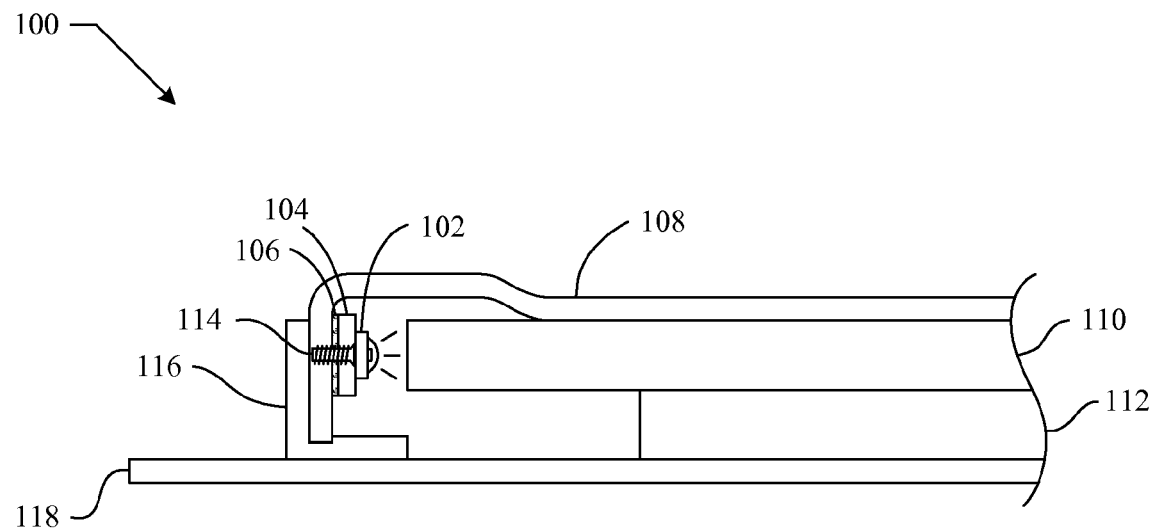
FIG. 1A shows a cross-section of an LCD assembly.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

LCD modules can be used in a large number of devices in the consumer electronics industry including computer monitors, laptop computers, mobile phones, handheld video game systems, navigation systems and televisions. LCD modules can include an LCD cell, light guide, illumination source, and electronics. The illumination source can be located on one or more sides of the LCD module and can supply light to the light guide. The light guide, in turn, can diffuse the light across the LCD module and project the light through the LCD cell, generating an image on the LCD module. The illumination source can be made up of a number of different light devices, including light emitting diodes (LEDs), fluorescent lamps, incandescent light bulbs, and electroluminescent panels. During operation of the LCD module, the illumination source can produce an amount of waste heat approximately proportional to the light produced by the illumination source. If this waste heat is not transported away from the LED module, several problems can occur.

First, waste heat can alter the color of light produced by the illumination source. Increasingly, LCD modules are including an illumination source made from an LED light bar. The small size and low power consumption of LEDs can make them favorable to conventional illumination sources such as fluorescent lamps. However, the inclusion of LEDs can lead to distortions in colors produced by the LCD module if waste heat generated by the LEDs is not adequately dissipated and distributed across the LCD module. Light emitted from the LEDs can increase in wavelength as the temperature of the LED increases, changing the color of the light emitted. This can affect the color of the resulting picture produced by the LCD module. Second, liquid crystals included in the LCD cell can change behavior based on temperature. This can lead to a perceivable color shift across the length a screen when the liquid crystals are not kept at a uniform temperature. Third, waste heat can damage any nearby structures and electronics. In particular, excessive amounts of waste heat generated by an illumination source can cause melting or warping of plastic housings and components. Moreover, waste heat can cause printed circuit boards to warp, increasing the risk that solder connections can be broken. Fourth, higher temperatures generated by waste heat can increase electrical resistance in conducting lines within a device, slowing signal speed and reducing performance. As devices become more complex, conducting paths can become longer and this performance reduction can be more significant.

For the above stated reasons, it can be desirable to locate the illumination source as far from the LCD cell as possible. However, space restrictions and cosmetic considerations often impose design constraints that can place the illumination source in close proximity to the LCD cell. Therefore, a waste heat transport system can be needed for efficiently removing heat from an illumination source while using a minimal amount of space. One solution is to house the LCD module in a thermally conductive chassis and thermally couple the illumination source to the metal chassis. Additionally, the LCD cell can be kept at a uniform temperature by transferring heat from a region near the illumination source to a relatively cooler region of the LCD cell. Together, these approaches can reduce damage to the device and minimize any alterations or shifts in color resulting from waste heat generated by the illumination source.

FIG. 1A shows a cross-sectional view of LCD assembly 100. Chassis 108 can house light guide 110 and LCD cell 112, providing protection and support. Chassis 108 can be formed of a thermally conductive material, such as aluminum or steel. Alternatively, chassis 108 can be formed from non-metallic thermally conductive materials such as graphite or a carbon fiber composite. Light guide 110 can further include a reflector and a layer of plastic configured to diffuse light evenly across LCD assembly 100. In addition, LCD cell 112 can include a thin film transistor (TFT) glass layer, liquid crystals, color filters, and various optical layers used for producing an image. Signals can be sent to the liquid crystals, allowing varying amounts of light into various color filters. These reactive properties of these liquid crystals can change as temperature increases. Thus, changes in temperature can affect the color of light output by LCD cell 112. Cover glass layer 118 can be located next to LCD cell 112, forming a front surface of LCD assembly 100. Cover glass layer 118 can be formed from any suitable optically transparent material, including various types of glass, plastics, and polymers. Cover glass 118 can also be coupled to metal chassis 108 by mounting frame 116. Mounting frame 116 can be made from a material having low thermal conductivity such as glass or plastic.

An illumination source can be provided along at least one edge of light guide 110. In one embodiment, the illumination source can include an LED light bar. An LED light bar can be formed by mounting a collection of LEDs 102 on a thermally conductive substrate. In one embodiment, the thermally conductive substrate can include metal core printed circuit board (MCPCB) 104. MCPCB 104 can include a metallic substrate overlaid with metal traces providing power to LEDs 102. The metallic substrate can include any thermally conductive metal, including aluminum, copper, and silver. It is not necessary that the substrate be a MCPCB and other types of thermally conductive substrates such as silicone, graphite, and thermally conductive thermoplastics can be used in place of MCPCB 104.

LEDs 102 can include at least one white LED or a combination of colored LEDs configured to create additive white light when combined. LEDs 102 can be bonded or fastened to MCPCB 104 using a thermally conductive adhesive or fasteners. The inclusion of a thermally conductive core in MCPCB 104 can efficiently conduct heat away from LEDs 102 and distribute heat evenly along the LED light bar. Thermal pad 106 can be placed between MCPCB 104 and chassis 108 to more efficiently conduct heat into chassis 108. Thermal pad 106 can include a filler or adhesive material configured to increase thermal conductivity between LEDs 102 and MCPCB 104. In one embodiment, a filler material made primarily of tin can be used to efficiently transfer heat. However, other thermally conductive materials such as paraffin or silicone based compounds can be used as well. MCPCB 104 can be coupled to chassis 108 by any thermally conductive means. In one embodiment, MCPCB 104 can be bonded to chassis 108 using thermally conductive adhesive or tape. In another embodiment, MCPCB 104 can be fastened to chassis 108 using thermally conductive fasteners 114. Fasteners 114 can be spaced between LEDs 102 along the length of MCPCB 104 and can provide another path for heat to transfer from MCPCB 104 to chassis 108. In yet another embodiment, LEDs 102 can be bonded or fastened directly onto chassis 108. This solution can provide a cleaner path for waste heat to enter chassis 108, but can result in increased work should the LEDs need to be replaced.

LEDs 102 can operate at temperatures as high as 70° C. This waste heat can be conducted through MCPCB 104 and thermal pad 106 into chassis 108. Then, heat can flow along chassis 108, distributing the waste heat across LCD assembly 100 and allowing the heat to dissipate through convection. In one embodiment, chassis 108 can be configured to have reduced thickness in proportion to a distance from LEDs 102 as less thermal conductivity can be required due to convection of heat off of metal chassis 108. Mounting frame 116 and cover glass 118 can act as a thermal insulator, reducing the amount of waste heat that can reach LCD cell 112 by way of the front surface of LCD assembly 100. Furthermore, plastic light guide 110 can act as a thermal insulator, protecting LCD cell 112 from the heat transmitted through chassis 108. In addition to chassis 108, heat can be transferred into other structures that are available to guide waste heat away from LCD cell 112. The conduction of heat away from LEDs 102 can prevent increased temperatures from altering the color of light emitted from LEDs 102 and ensure that all LEDs are producing about the same wavelength of light.

Figure 1B:
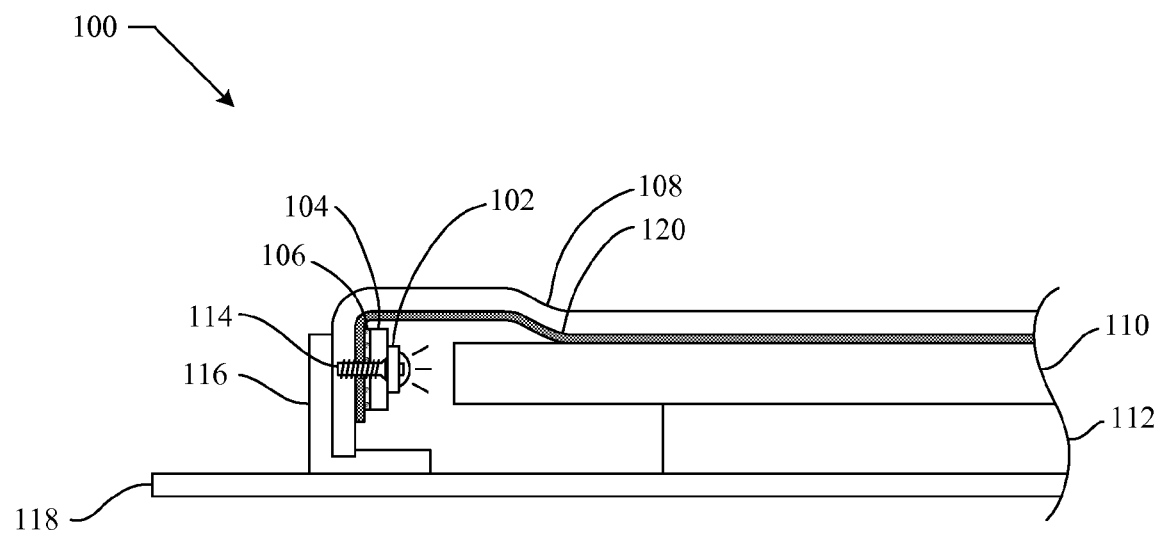
FIG. 1B shows a cross-section of an LCD assembly including a layer of graphite for increased thermal conductivity.

FIG. 1B shows a cross-sectional view of another embodiment of LCD assembly 100. Graphite layer 120 is included between MCPCB 104 and metal chassis 108 as well as along the length of metal chassis 108. Thermal pad 106 can be used to efficiently transmit heat from MCPCB 104 to graphite layer 120. Graphite can have higher thermal conductivity properties than metals such as aluminum that can be used to form chassis 108. In particular, a graphite material exhibiting high anisotropic thermal conductivity can be used. These materials can have high thermal conductivity along one direction or plane and relatively lower thermal conductivity in a direction normal to the plane. By orienting graphite layer 120 appropriately, waste heat can be conducted along the length of graphite layer 120 while reducing heat conduction in a direction towards LCD cell 112. Thus, the inclusion of graphite layer 120 can increase the rate at which heat is conducted away from LEDs 102 while insulating LCD cell 112 from waste heat generated by the illumination source.

Figure 2:
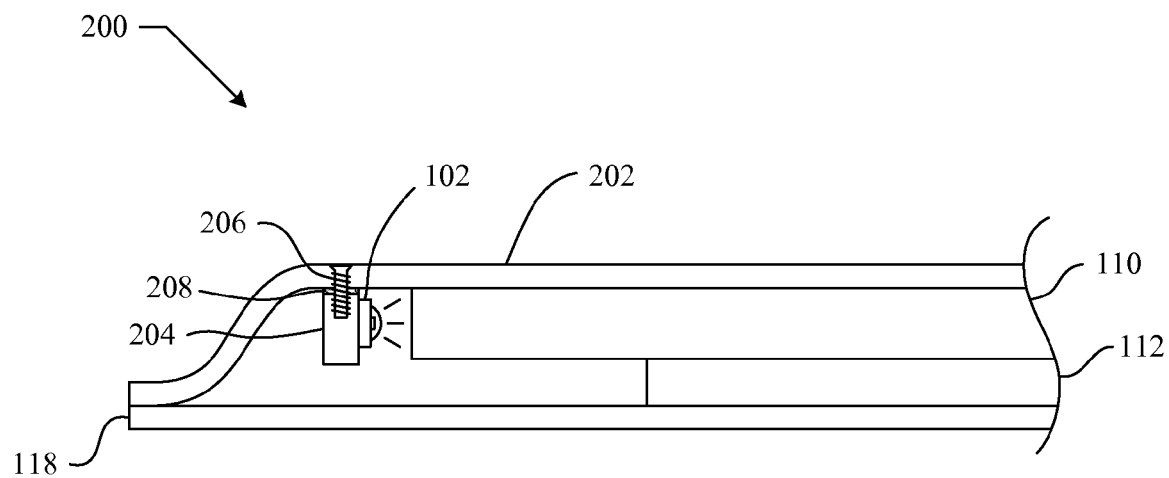
FIG. 2 shows a cross-section of an LCD assembly where an illumination source is fastened along an edge to a metal chassis.

FIG. 2 shows a cross-sectional view of LCD assembly 200, demonstrating another embodiment of a waste heat transport system. Light guide 110 and LCD cell 112 can be housed within chassis 202. Chassis 202 can be constructed from a thermally conductive material and can be configured to attach directly to cover glass 118 along an edge of LCD assembly 200. Furthermore, LEDs 102 can be mounted on a thermally conductive substrate coupled to chassis 202. In one embodiment, the thermally conductive substrate can include MCPCB 204. MCPCB 204 can have a core made from a thermally conductive material such as aluminum, silver, or copper Furthermore, MCPCB 204 can include traces for supplying power to LEDs 102 and have a thickness sufficient to receive a threaded fastener along a side adjacent to a side on which LEDs 102 are positioned. A thickness as small as about 2-4 mm can be sufficient to engage with a fastener, but other sizes of MCPCBs can be used as well, including thermally conductive substrates with additional thickness. MCPCB 204 can be coupled to chassis 202 by any thermally conductive means. In one embodiment, MCPCB 204 can be bonded to chassis 202 using thermally conductive adhesive or tape. In another embodiment, MCPCB 204 can be fastened to chassis 202 using thermally conductive fasteners 206. In addition, thermal pad 208 can be placed between MCPCB 204 and metal chassis 202 to more efficiently conduct heat into chassis 202. Thermal pad 208 can include a filler or adhesive material configured to increase thermal conductivity. In one embodiment, a filler material made primarily of tin can be used to efficiently transfer heat. However, other thermally conductive materials such as paraffin or silicone based compounds can be used as well.

Due to the placement of fasteners 206 on the side of MCPCB 204, the need for spaces between LEDs 102 for fasteners can be avoided. The increased space between LEDs 102 can be used to implement an illumination source using colored LEDs. Colored LEDs, as opposed to white LEDs, can include a mix of red, green and blue colored LEDs. When used together, these color LEDs can create white light with wavelengths that closely match color filters in LCD cell 112. In this way, a filter passband can be narrowed so that each color component lets only a very narrow band of spectrum through LCD cell 112. This can improve the efficiency of LCD assembly 200 since less light is blocked when white light is displayed. The resulting decrease in required light levels can reduce the amount of waste heat generated by LEDs 102. Thus, placement of fasteners 206 along the side of MCPCB 204 can reduce the heat output of LEDs 102, mitigating any color shifts caused by a rise in temperature.

Figure 3:
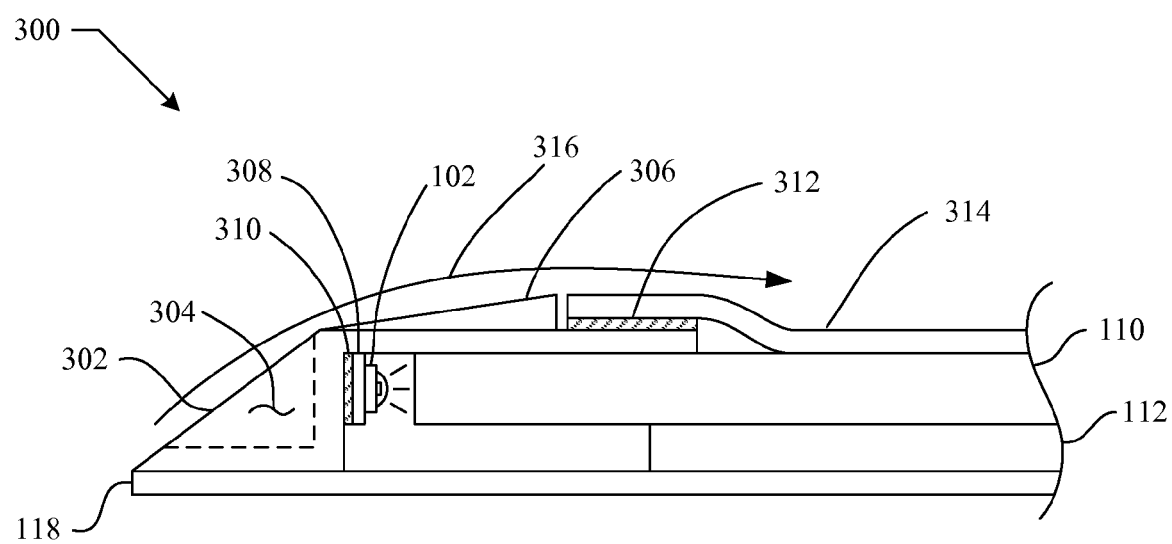
FIG. 3 shows a cross-section of an LCD assembly where cooling fins have been included to increase convection.

FIG. 3 shows a cross-sectional view of LCD assembly 300, demonstrating another embodiment of a waste heat transport system. Light guide 110 and LCD cell 112 can be placed in front of frame 314. Frame 314 can be formed from any thermally conductive material, including aluminum, steel, graphite, or other similar materials. Heat sink 302 can be attached to cover glass 118 and thermally coupled to frame 314. Thermal pad 312 can be placed between metal frame 314 and heat sink 302 to increase the ability of heat to transfer from heat sink 302 into metal frame 314. Thermal pad 312 can include a filler or adhesive material configured to increase thermal conductivity. In one embodiment, a filler material made primarily of tin can be used to efficiently transfer heat. However, other thermally conductive materials such as paraffin or silicone based compounds can be used as well. Heat sink 302 can be constructed from metal or any suitable thermally conductive material. In one embodiment, heat sink 302 can be machined from a thermally conductive metal such as aluminum. In another embodiment, heat sink 302 can be molded from a thermally conductive thermoplastic or similar material. Furthermore, heat sink 302 can include cooling fins 306. Several cooling fins 306 can be included in heat sink 302 along the length of an edge of LCD assembly 300 to increase surface area available for convection. In addition, heat sink 302 can include a number of cutouts 304, creating additional surface area for convection. LEDs 102 can be thermally and mechanically coupled to MCPCB 308 using fasteners or a thermally conductive adhesive. Then, MCPCB 308 can be attached to heat sink 302 using thermally conductive adhesive, fasteners or thermally conductive tape. Thermal pad 310 can be placed between MCPCB 308 and heat sink 302 to provide an increase in thermal conductivity. Thermal pad 310 can be made from materials similar to thermal pad 312.

Airflow path 316 can describe a flow of air across LCD assembly 300. Airflow 316 can be created by a fan or similar suitable device for moving air. Furthermore, airflow 316 can move in directions other than the direction shown in FIG. 3, including a direction opposite the direction shown in FIG. 3 and a direction approximately parallel to MCPCB 308. As airflow 316 passes over heat sink 302, heat can be transferred away from heat sink 302 through convection. Cooling fins 306 and cutouts 304 can increase the surface area of heat sink 302, increasing the rate at which waste heat is removed by airflow 316 through convection. In addition to convection, waste heat can also be conducted away from LEDs 102 by traveling through heat sink 302 and into metal frame 314. In addition to cooling LEDs 102, airflow and thermal conduction in a direction towards an opposite end of LCD assembly 300 can decrease any disparities in temperature across LCD cell 112.

Figure 4:
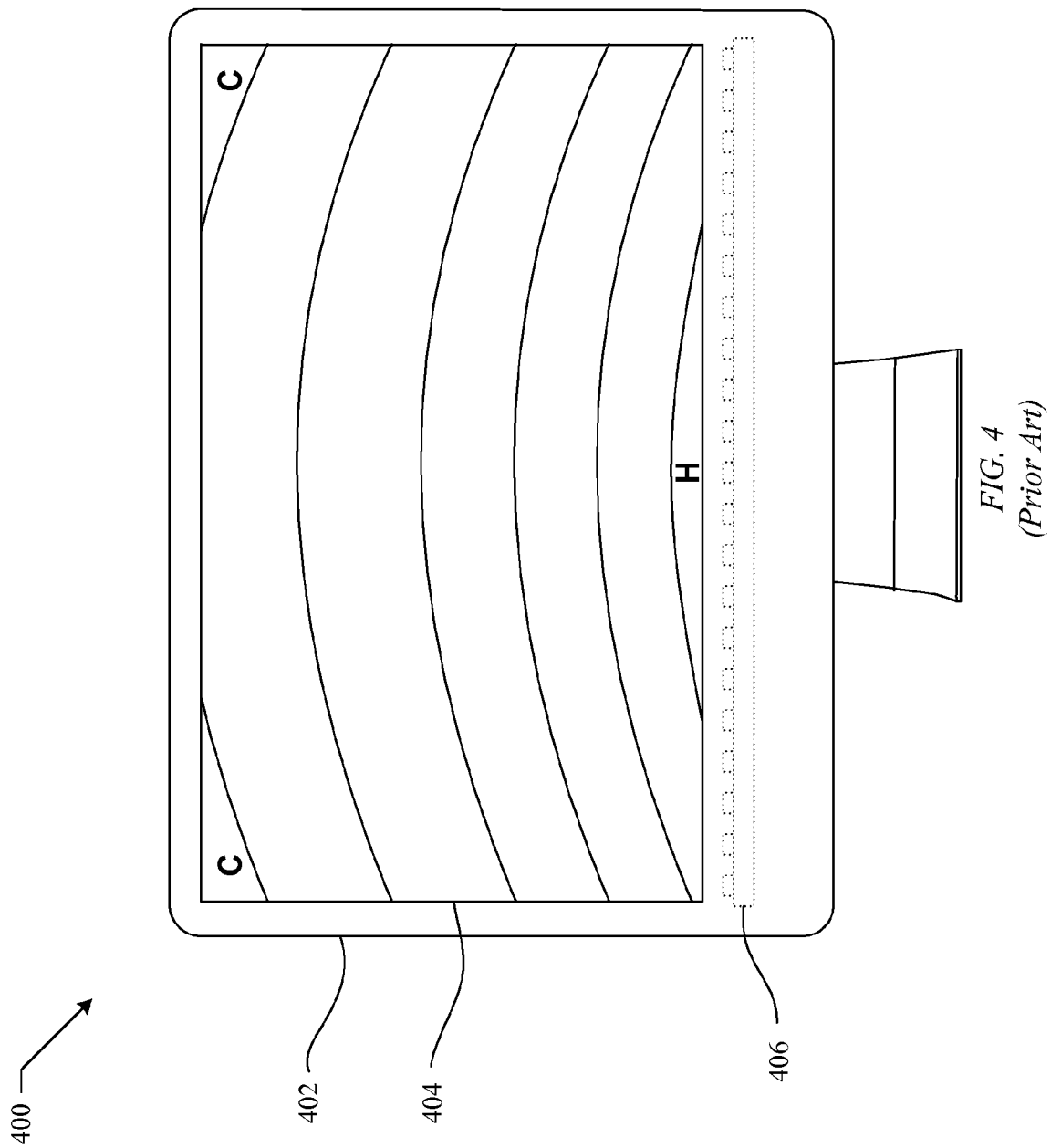
FIG. 4 shows a typical temperature gradient across an LCD module included in a computing device.

FIG. 4 shows a front view of a prior art computing device 400 including an LCD module with an LED backlight. Illumination source 406 shows the approximate location of an LED light bar or similar light emitting source within computing device 400. LCD module 404 can be contained within housing 402. Waste heat from illumination source 406 can disproportionately warm regions of LCD module 404 near to illumination source 406. Furthermore, regions near an edge of computing device 400 can be cooler than regions near the center due to increased contact with outside air. The result can be a temperature distribution similar to the one shown in FIG. 4. H denotes a region of LCD module 404 that is relatively hot and C denotes regions that are relatively cold. Even when thermal management features such as methods described earlier in the present disclosure are employed, a similar temperature distribution can occur. This can result from small amounts of heat traveling through thermal insulators such as mounting frame 116, cover glass 118, and light guide 110 shown in FIG. 1A. Moreover, radiant heat from illumination source 406 can impact LCD module 404 and disproportionally heat one side of LCD cell 112.

Liquid crystals can behave differently depending on the temperature in which they operate. In particular, variations in temperature can affect an amount of light that is allowed to pass from a backlight through a color filter and out a front surface of LCD module 404. Each pixel in LCD module 404 can emit a color based on an amount of light allowed through red, green and blue color filters. When the underlying liquid crystals change temperature, the amount of light allowed through each filter can vary, modifying the color of light emitted by the pixel. This result can be particularly severe when an LCD module is displaying a picture which contains mostly white space. A human eye can be particularly adept at detecting minute differences in shades of white. Therefore, a temperature gradient such as the one depicted in FIG. 4 can result in a perceptible color shift in the light emitted across LCD module 404. The present disclosure includes several solutions to mitigate this problem.

Figure 5:
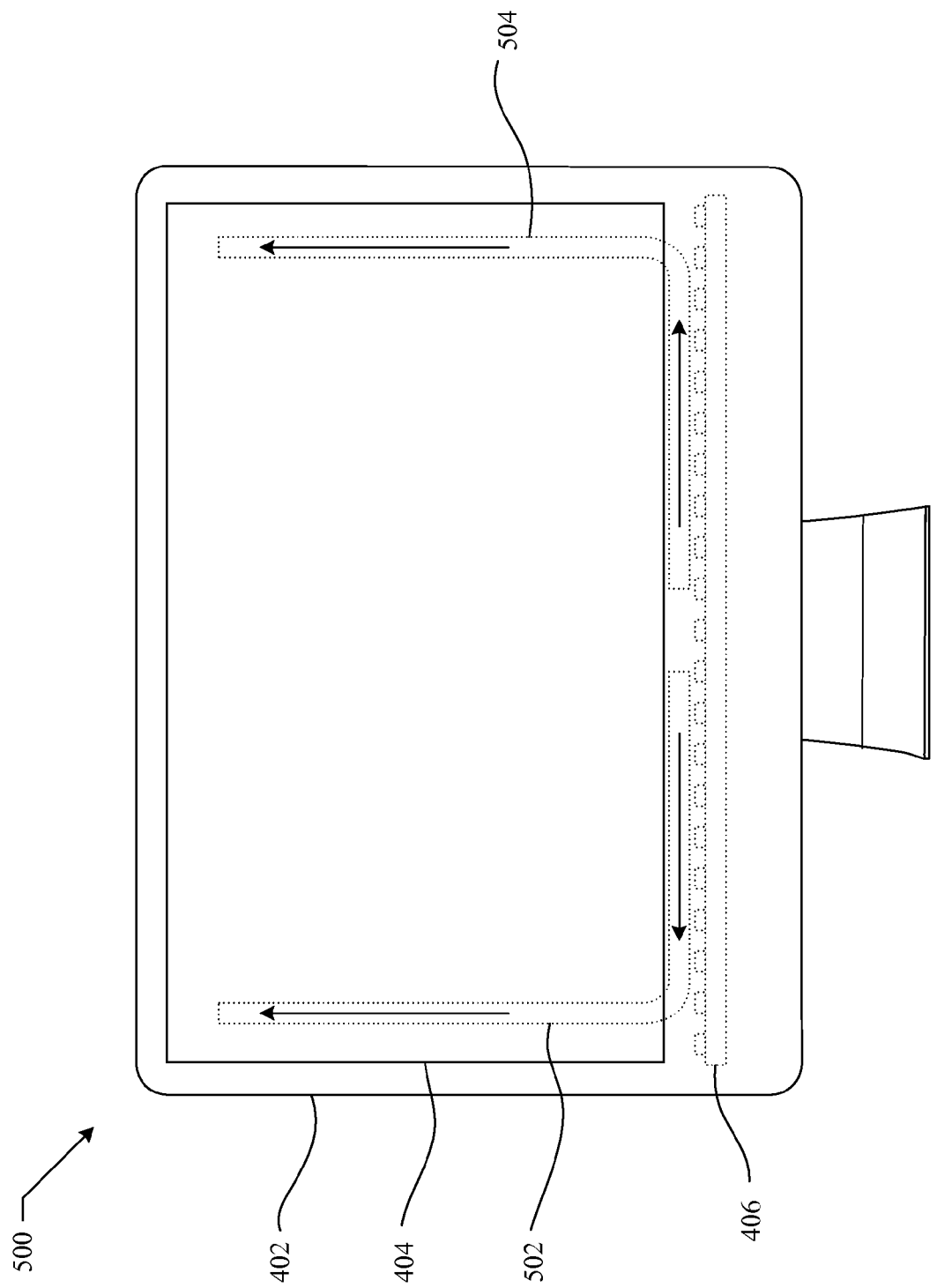
FIG. 5 shows a computing device including heat pipes to direct waste heat from a hotter region of an LCD module to a cooler region.

FIG. 5 shows a front view of computing device 500, demonstrating another embodiment of a waste heat transport system. LCD module 404 can be contained within housing 402 and light for LCD module 404 can be provided by illumination source 406. Heat pipes 502 and 504 can transport heat from a relatively hotter region of computing device 500 near the center of Illumination source 406 to relatively cooler regions near the upper corners of LCD module 404. The relatively cool regions of computing device 500 can be located in other regions of computing device 500 and the present disclosure includes embodiments in which heat pipes 502 and 504 are directed towards different regions of computing system 500. Moreover, any number of heat pipes can be used to transport heat and the present disclosure is not limited to applications utilizing two heat pumps.

Heat pipes 502 and 504 can operate by containing a liquid that undergoes a phase transition between a hot end near illumination source 406 and a cool end opposite the hot end. Various liquids can be used within heat pipes 502 and 504. For example, ammonia, alcohol, and water can be configured to operate in temperatures similar to those generated by illumination source 406. The pressure inside of heat pipes 502 and 504 can be adjusted to select a boiling point slightly lower than a typical operating temperature for illumination source 406. The hot end of heat pipes 502 and 504 can be coupled to illumination source 406 in a manner configured to allow for high thermal conduction. As heat enters the hot end of heat pipes 502 and 504, the liquid contained within can undergo a phase transition and turn into a vapor. This vapor can rise through heat pipes 502 and 504 until the vapor reaches the cold end. At this point, the vapor can condense back into a liquid, releasing any latent heat gained on the hot end. In this manner, heat can be transported from relatively hotter regions of computing device 500 to relatively cooler regions. This can mitigate the effects of any temperature gradient and reduce any visible color shifts in light emitted from LCD module 404.

Figure 6:
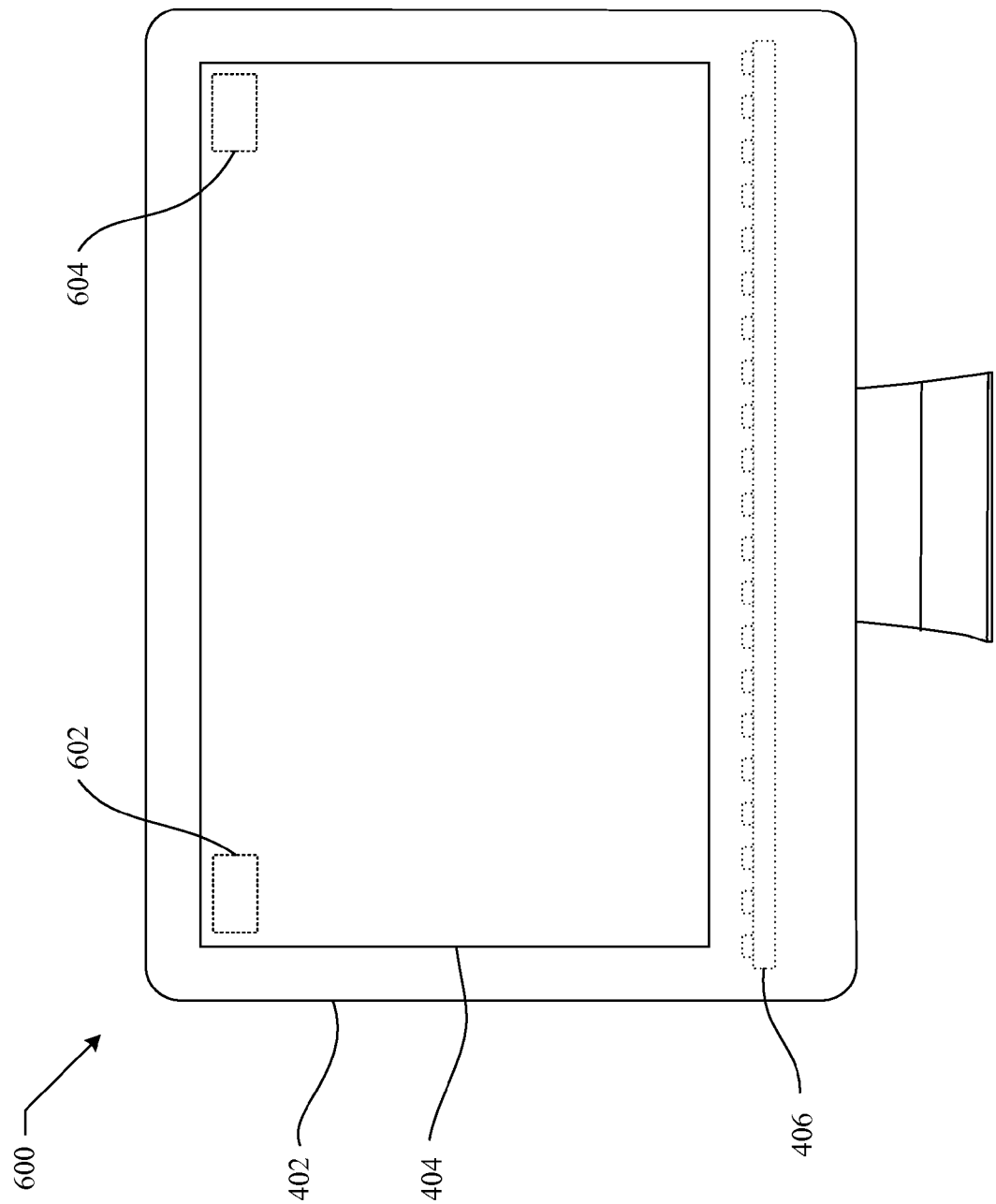
FIG. 6 shows a computing device including waste heat generating electrical components located near cooler regions of an included LCD module.

FIG. 6 shows a front view of computing device 600, demonstrating another embodiment of a waste heat transport system. LCD module 404 can be contained within housing 402 and light for LCD module 404 can be provided by illumination source 406. Electronic components 602 and 604 are positioned in relatively cool areas of LCD module 404 and can include any electronic components that create a significant amount of waste heat. In one embodiment, electronic components 602 and 604 can include driver circuits for sending signals to LCD cell 112. Alternatively, other heat producing electronic components such as central processing units (CPUs) and graphics processing units (GPUs) can make up electronic components 602 and 604. By placing electronic components 602 and 604 in relatively cool regions of computing device 600 and providing a thermally conductive path from electronic components 602 and 604 to LCD cell 112, a more uniform temperature can be maintained across LCD module 404. This can mitigate the effects of any temperature gradient and reduce any visible color shifts in light emitted from LCD module 404. The location of electronic components 602 and 604 can be in places other than those depicted in FIG. 6 if a temperature gradient necessitates placement in other regions. Moreover, more or less than two electronic components can be used to modify the temperature of LCD module 404 and the present disclosure includes variations using any number electronic components.

Figure 7:
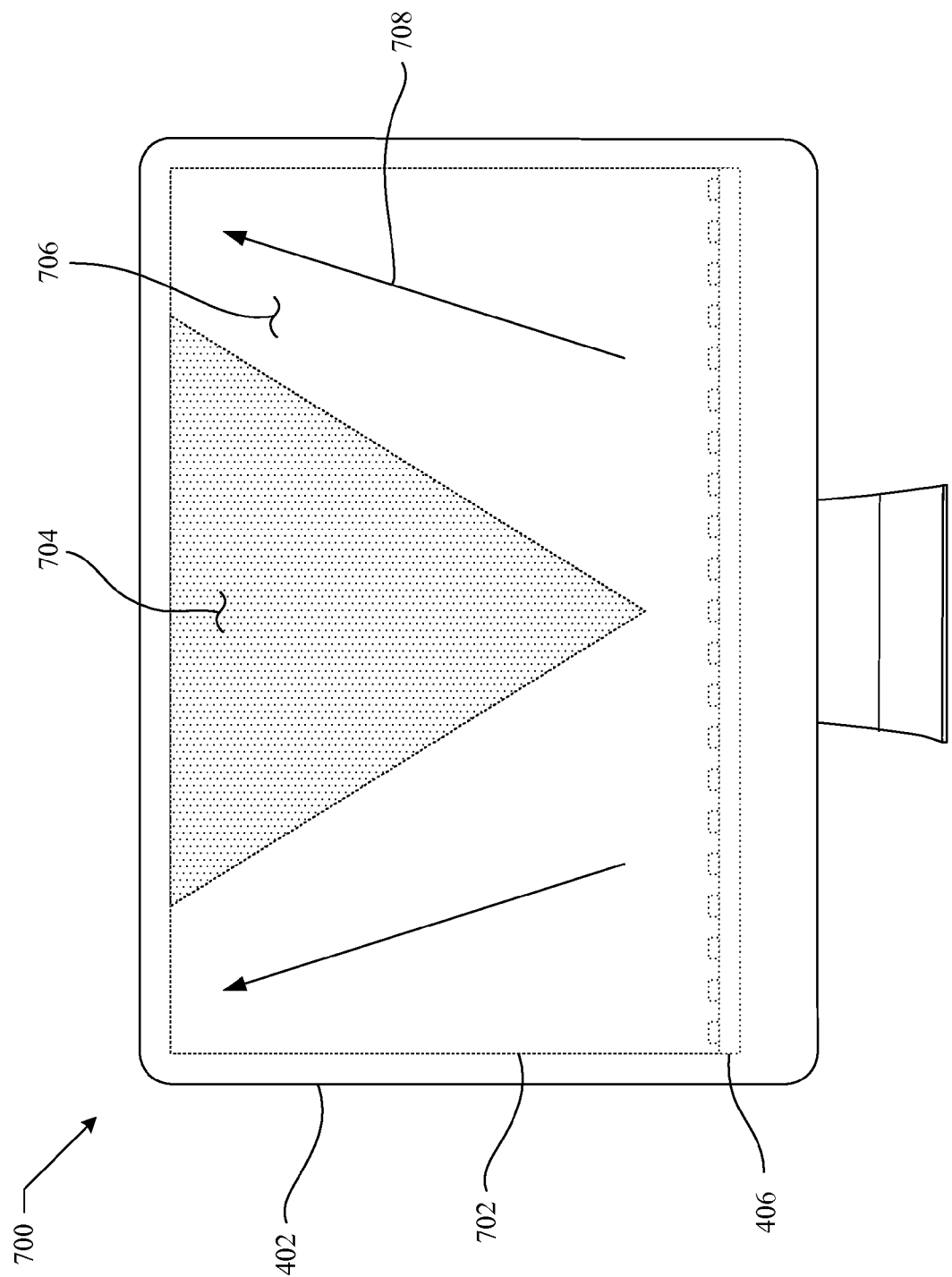
FIG. 7 shows a computing device including a thermally conductive chassis configured to draw waste heat from a hotter region of an included LCD module to a cooler region.

FIG. 7 shows a front view of computing device 700, demonstrating another embodiment of a waste heat transport system. Illumination source 406 provides light for LCD module 404. The front of computing device 700 and LCD module 404 are not shown to provide a view of chassis 702. Chassis 702 can be made from any thermally conductive material including aluminum, graphite, carbon fiber, and thermally conductive thermoplastics. Furthermore, chassis 702 can be thermally coupled to illumination source 406 along a lower edge and extend upwards to house light guide 110 and LCD cell 112. Chassis 702 can be fabricated to include regions of varying thickness. Region 706 can represent a relatively thicker region of metal chassis 702 while region 704 can represent a relatively thinner region. An amount of waste heat conducted from illumination source 406 and through chassis 702 can be proportional to the thickness of the material through which the waste heat is conducted. In this manner, heat can be directed approximately along paths 708 towards relatively cooler regions in the corners of LCD module 404 and away from relatively hotter regions in the middle of LCD module 404. This can mitigate the effects of any temperature gradient and reduce any visible color shifts in light emitted from LCD module 404. The regions of varying thickness can be placed in locations other than those shown in FIG. 7 if a temperature gradient necessitates placement in other regions.

FIGS. 8A and 8B show a cross-sectional view and front view of computing device 800 respectively, demonstrating another embodiment of a waste heat transport system. LCD cell 112 and light guide 110 can be housed within chassis 108. In turn, chassis 108 can be housed within housing 402 and attached to cover glass 118. Illumination source 406 can provide light for light guide 110 and LCD cell 112. Air inlet 804 can be provided at a lower end of housing 402 and air outlet 806 can be provided at an upper end of housing 402. Airflow path 802 can represent a flow of air through computing device 800 from air inlet 804 to air outlet 806. As air flows past illumination source 406, heat can be transferred to the air through convection from surfaces of illumination source 406 and chassis 108. As the air continues to flow upwards along airflow path 802, some of the heat transferred to the air can be transferred back to chassis 402 near an upper region of computing device 800. This heat can be transferred through light guide 110 to LCD cell 112. In this manner, heat from relatively hotter regions near the bottom of LCD cell 112 can be transferred to relatively cooler regions near the top of LCD cell 112. This can mitigate the effects of any temperature gradient and reduce any visible color shifts in light emitted from LCD module 404.

Airflow 802 can be produced by including one or more fans in computing device 800. For example, fans or fan 801 can be placed near air inlet 804 or air outlet 806. A speed of airflow 802 can be adjusted by increasing or decreasing a voltage supplied fans or fan 801. As the speed of fans or fan 801 increases, the speed of airflow 802 increases. This increase in airflow speed can increase the rate at which waste heat is convected from chassis 108. As chassis 108 cools, waste heat can be conducted from illumination source 406 to chassis 108 at a higher rate. One or more temperature sensors can be included in computing device 800 to collect temperature data at various points throughout computing device 800. For example, temperature sensors can be placed on illumination source 406 and in one or more locations on LCD module 404. These temperature sensors can be coupled to a controller configured to receive temperature data. Moreover, the controller can also be coupled to fans or fan 801 and can control the speed of fans or fan 801 to keep illumination source 406 and LCD module 404 within a pre-defined operating temperature range. Thus, computing device 800 can dynamically control airflow 802 to prevent waste heat from illumination source 406 from damaging any components of computing device 800 or creating a visible color shift in light emitted from LCD module 404.

Figures 9A, 9B:
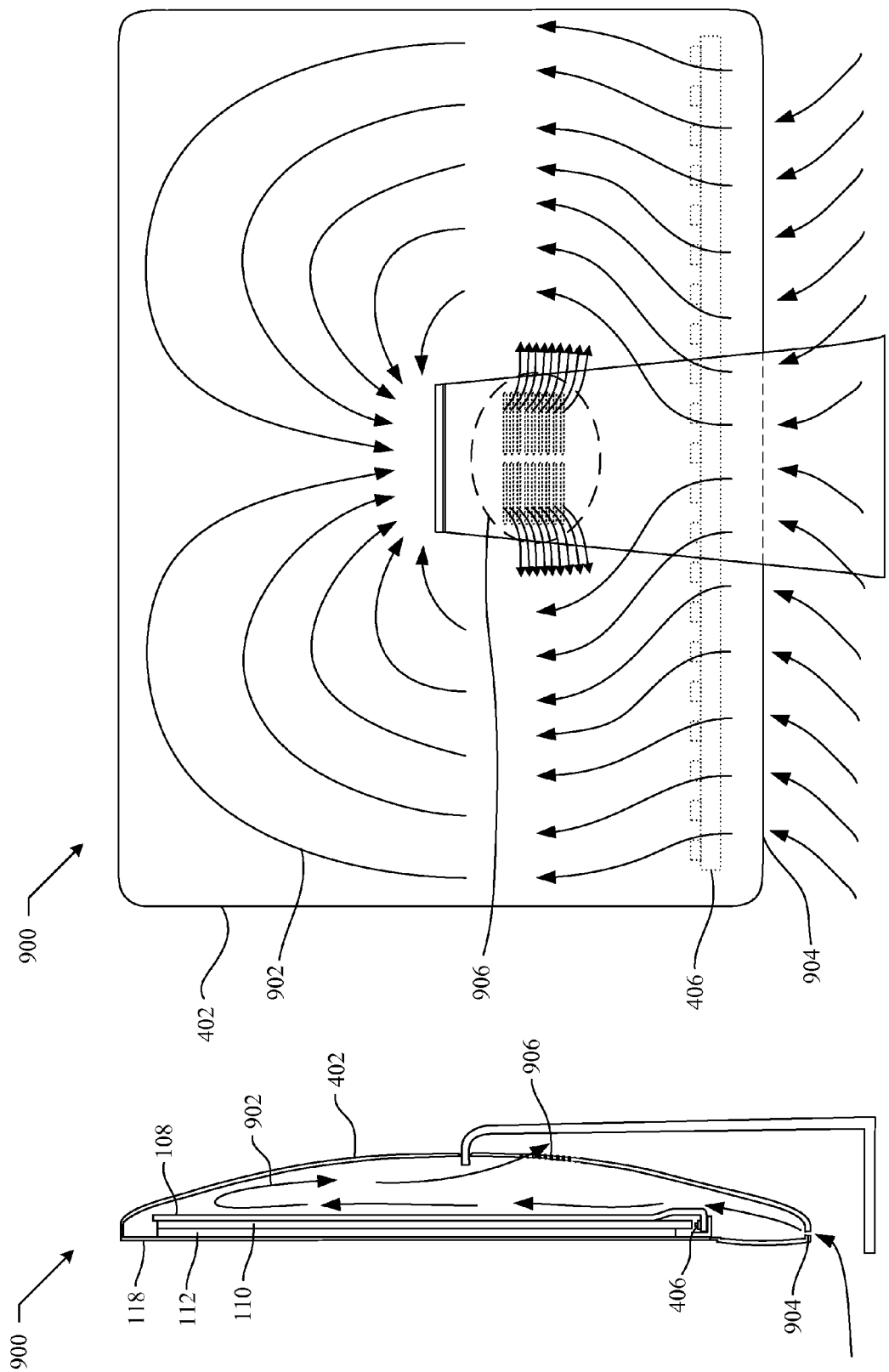
FIG. 9A shows a cross sectional view of a computing device in which an included LCD module is kept at a uniform temperature using an airflow from the bottom to the middle of the device.
FIG. 9B shows a back view of a computing device in which an included LCD module is kept at a uniform temperature using an airflow from the bottom to the middle of the device.

FIGS. 9A and 9B show a cross-sectional view and rear view of computing device 900 respectively, demonstrating another embodiment of a waste heat transport system with a different airflow pattern. LCD cell 112 and light guide 110 can be housed within chassis 108. In turn, chassis 108 can be housed within housing 402 and attached to cover glass 118. Illumination source 406 can provide light for light guide 110 and LCD cell 112. Air inlet 904 can be provided at a lower end of housing 402 and air outlet 906 can be provided on a rear surface near a center region of housing 402. Airflow path 902 can represent a flow of air through computing device 900 from air inlet 904 to air outlet 906. As air flows past illumination source 406, heat can be transferred to the air through convection from surfaces of illumination source 406 and chassis 108. As the air continues to flow upwards along airflow path 902, some of the heat transferred to the air can be transferred back to chassis 108 near an upper region of computing device 900. This heat can be transferred through light guide 110 to LCD cell 112. In this manner, heat from relatively hotter regions near the bottom of LCD cell 112 can be transferred to relatively cooler regions near the top of LCD cell 112. This can mitigate the effects of any temperature gradient and reduce any visible color shifts in light emitted from LCD module 404. A fan, temperature sensors, and a controller can be included in computing device 900 to dynamically control airflow 902 similar to computing device 800.

Figure 10:
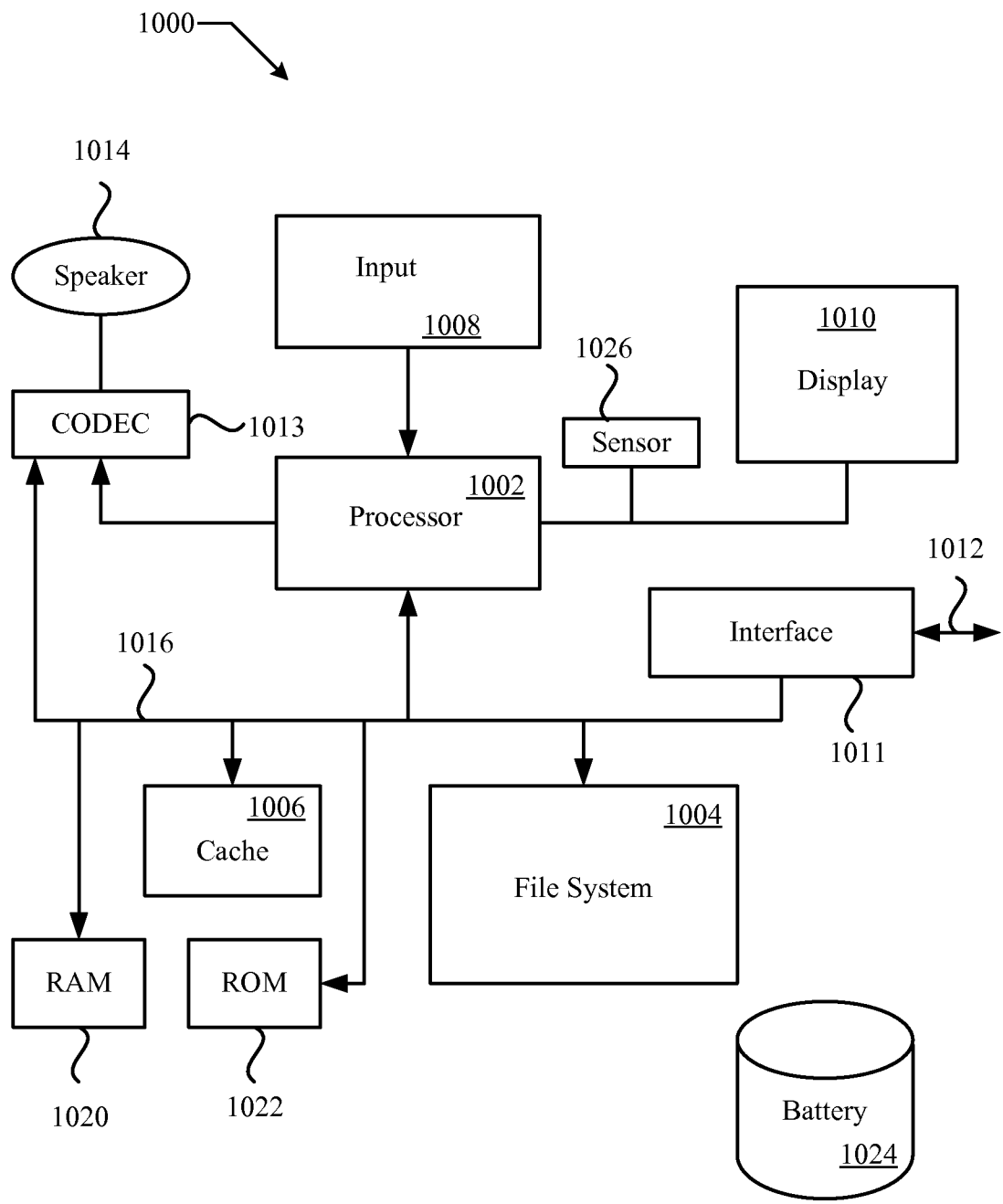
FIG. 10 shows a block diagram of a controller.

FIG. 10 shows a block diagram of electronic controller 1000, suitable for use in computing devices 800 and 900 by collecting data from temperature sensors and controlling a fan speed to keep illumination source 406 and LCD module 404 within a pre-defined range. Controller 1000 illustrates circuitry of a representative computing device. Controller 1000 includes a processor 1002 that pertains to a microprocessor or controller for controlling the overall operation of controller 1000. Controller 1000 contains instruction data pertaining to temperature targets and fan dynamics in a file system 1004 and a cache 1006. The file system 1004 is, typically, a storage disk or a plurality of disks. The file system 1004 typically provides high capacity storage capability for the controller 1000. However, since the access time to the file system 1004 is relatively slow, the controller 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the controller 1000 is a portable device that is powered by a battery 1024. The controller 1000 can also include a RAM 1020 and a Read-Only Memory (ROM) 1022. The ROM 1022 can store programs, utilities or processes to be executed in a non-volatile manner. The RAM 1020 provides volatile data storage, such as for cache 1006.

The controller 1000 also includes a user input device 1008 that allows a user of the controller 1000 to interact with the controller 1000. For example, the user input device 1008 can take a variety of forms, such as a button, keypad, dial, touch screen, audio input interface, visual/image capture input interface, input in the form of sensor data, etc. Still further, the controller 1000 can include a display 1010 (screen display) that can be controlled by the processor 1002 to display information to the user. A data bus 1016 can facilitate data transfer between at least the file system 1004, the cache 1006, the processor 1002, and a CODEC 1013. The CODEC 1013 can be used to decode and play a plurality of media items from file system 1004 that can correspond to certain activities taking place within computing devices 800 and 900. The processor 1002, upon a certain thermal event occurring, supplies the media data (e.g., audio file) for the particular media item to a coder/decoder (CODEC) 1013. The CODEC 1013 then produces analog output signals for a speaker 1014. The speaker 1014 can be a speaker internal or external to the controller 1000. For example, headphones or earphones that connect to the controller 1000 would be considered an external speaker.

The controller 1000 also includes a network/bus interface 1011 that couples to a data link 1012. The data link 1012 allows the controller 1000 to couple to a host computer or to accessory devices. The data link 1012 can be provided over a wired connection or a wireless connection. In the case of a wireless connection, the network/bus interface 1011 can include a wireless transceiver. The media items can be any combination of audio, graphical or visual content. Sensor 1026 can take the form of circuitry for detecting any number of stimuli. For example, sensor 1026 can include any number of sensors for monitoring a thermal management system including sensors to detect temperatures in various locations within computing devices 800 and 900.

Figure 11:
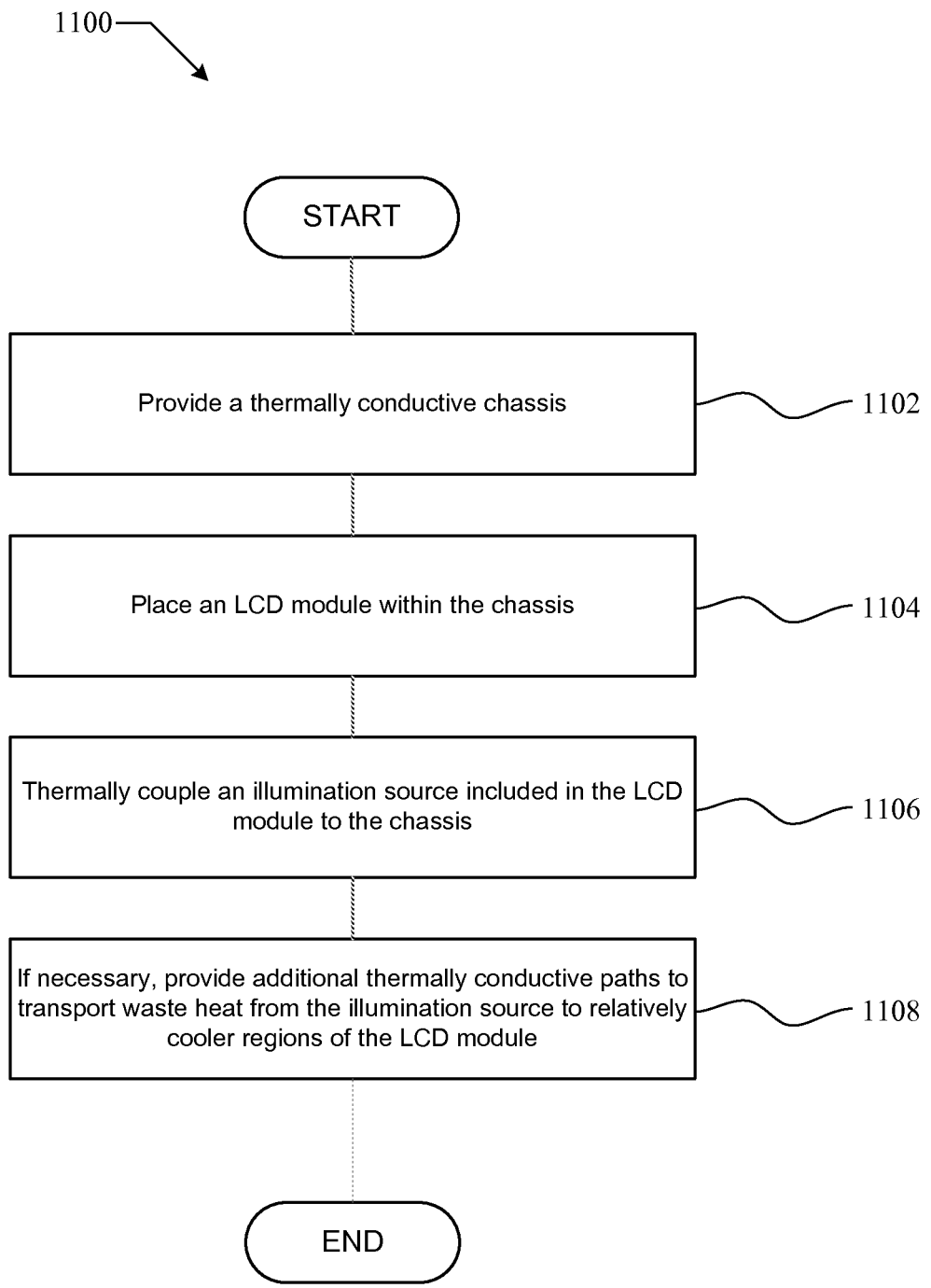
FIG. 11 shows a flow chart describing a process for removing waste heat from an illumination source.

FIG. 11 shows a flow chart describing process 1100 in accordance with the described embodiments. In step 1102, a thermally conductive chassis can be provided. The chassis can be similar to chassis 108 shown in FIG. 1A and can be constructed from any suitable thermally conductive material. In step 1104, an LCD module can be supported and enclosed within the chassis. The LCD module can include an LCD cell, a light guide, and an illumination source. The illumination source can be placed along an edge of the LCD module and configured to direct light into the light guide. In step 1106, the illumination source can be thermally coupled to the chassis to direct waste heat away from the illumination source and into the chassis. This can be accomplished through fasteners or a thermally conductive adhesive and can include a thermal pad to increase thermal conductivity. If necessary, in step 1108, additional waste heat transport systems can be included to transport waste heat from the illumination source towards an opposite end of the LCD module. Several embodiments of waste heat transport systems can be available. In one embodiment, one or more heat pipes can be used to transport heat. In another embodiment, an airflow system can be provided to remove waste heat from the illumination source and deposit the waste heat near an opposite end of the LCD module.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:
1. A computing device, comprising:
a chassis formed of a thermally conductive material and configured to support operating components;
a liquid crystal display (LCD) module having a proximal edge and distal edge opposite the proximal edge, the LCD module comprising:
an illumination source located proximate to the proximal edge and configured to provide light and heat,
a light guide configured to receive and internally disperse at least some of the light provided by the illumination source, and
an LCD cell configured to receive at least some of the internally dispersed light from the light guide, wherein the LCD cell comprises liquid crystals and a color filter, wherein the liquid crystals respond to a control signal by passing at least some of the internally dispersed light received from the light guide to the color filter; and
a cover glass layer disposed proximate to the LCD cell;
wherein the chassis has regions of varying thickness that preferentially distributes the heat generated by the illumination source from the proximal edge toward the distal edge of the LCD module.

2. The computing device as recited in claim 1, wherein the illumination source further comprises:
   a thermally conductive substrate;
   LED lights thermally coupled to one surface of the thermally conductive substrate; and
   electrical traces overlaid on the thermally conductive substrate and configured to deliver power to the LED lights.

3. The computing device as recited in claim 1, further comprising a graphite layer disposed along a surface of the chassis and thermally coupled to the illumination source, wherein the graphite layer is configured to anisotropically conduct the heat away from the illumination source by preferentially conducting the heat along a length of graphite layer.

4. The computing device as recited in claim 1, further comprising cooling fins configured to increase convection of the heat away from the illumination source.

5. The computing device as recited in claim 4, wherein the cooling fins is attached to a heat sink coupled to one or more LED lights.

6. The computing device as recited in claim 1, further comprising at least one heat pipe thermally coupled to the illumination source and configured to transfer the heat from the illumination source toward the distal edge of the LCD module.

7. The computing device as recited in claim 1, further comprising at least one electrical component thermally coupled to the LCD module and disposed proximate to the distal edge of the LCD module.

8. The computing device as recited in claim 1, further comprising:
   a mounting frame that attaches the cover glass layer to the chassis, wherein the mounting frame and the cover glass layer are configured to inhibit a flow of heat between the chassis and the LCD display module.

9. The computing device as recited in claim 1, wherein the chassis includes a thick region and a thin region, wherein the thick region transfers more of the heat toward the distal edge than the thin region.

10. The computing device as recited in claim 1, further comprising:
    an exterior housing configured to enclose the chassis and LCD module;
    an inlet disposed in a first surface of the exterior housing;
    an outlet disposed in a second surface of the exterior housing, wherein the inlet and outlet are configured such that an airflow moving from the inlet to the outlet distributes a portion of the heat from the illumination source from the proximal edge toward the distal edge; and
    a cooling fan configured to move air through the exterior housing from the inlet to the outlet.

11. The computing device as recited in claim 10, further comprising:
    at least one temperature sensor configured to detect a temperature of the illumination source; and
    a controller configured to receive data from the at least one temperature sensor and control a rotation speed of the fan to keep the illumination source within a pre-defined temperature range.

12. A computing device, comprising:
    a display module having a proximal end and a distal end opposite the proximal end, the display module comprising:
       a liquid crystal display (LCD) cell configured to display visual content of the computing device;
       an illumination source configured to provide light for the LCD cell, the illumination source positioned proximate to the proximal end such that heat generated by the illumination source heats the proximal end of the display module; and
    a chassis arranged to support the display module, the chassis comprising a thermally conductive material that is thermally coupled with the display module, wherein the chassis has regions of varying thickness that distribute the heat generated by the illumination source from the proximal end preferentially toward the distal end of the display module.

13. The computing device of claim 12, wherein the preferential distribution of the heat maintains a temperature of the display module within an operating temperature range.

14. The computing device of claim 12, wherein the heat is preferentially distributed toward a first corner and a second corner of the display of the distal end.

15. The computing device of claim 12, wherein the chassis includes a thick region and a thin region, wherein the thick region transfers more of the heat toward the distal end than the thin region.

16. The computing device of claim 12, further comprising:
    a graphite layer oriented so as to anisotropically conduct the heat generated by the illumination source away from the LCD cell in a region proximate the illumination source.

17. The computing device of claim 16, wherein the heat is preferentially distributed away from a central region of the display module.

18. The computing device of claim 12, further comprising:
    a mounting frame that attaches the chassis to a cover glass layer of the display module, the mounting frame and the cover glass layer configured to reduce an amount of heat flowing between the chassis and the display module.

19. The computing device of claim 12, wherein the illumination source is thermally coupled to that chassis via a metal core printed circuit board that supplies power to the illumination source.

20. The computing device of claim 12, wherein the chassis is comprised of aluminum, graphite, carbon fiber or thermally conductive thermoplastic.

21. The computing device of claim 12, wherein the computing device further comprises:
    an exterior housing and a fan, the exterior housing enclosing the display module and fan therein, the exterior housing including an air inlet proximate to the proximal end of the display module and an air outlet proximate to the distal end of the display module, wherein the fan increases airflow from the air inlet to the air outlet.

* * * * *